United States Patent [19]
Yarborough

[11] 3,846,715
[45] Nov. 5, 1974

[54] MULTIPLE DYE STREAM LASER
[75] Inventor: J. Michael Yarborough, Santa Clara, Calif.
[73] Assignee: Coherent Radiation, Palo Alto, Calif.
[22] Filed: May 30, 1973
[21] Appl. No.: 365,316

[52] U.S. Cl. .............................................. 331/94.5
[51] Int. Cl. .............................................. H01s 3/20
[58] Field of Search .................... 331/94.5; 330/4.5; 350/267, 312

[56] References Cited
UNITED STATES PATENTS
3,766,489  10/1973  Rosenberg et al. ................ 331/94.5

Primary Examiner—William L. Sikes
Attorney, Agent, or Firm—Limbach, Limbach & Sutton

[57] ABSTRACT

A dye laser utilizing an unconfined, flat fluid stream is provided with means for selectively introducing any one of a plurality of different dyes across the optical resonator path, each of said dyes having a different range of wavelengths.

8 Claims, 9 Drawing Figures

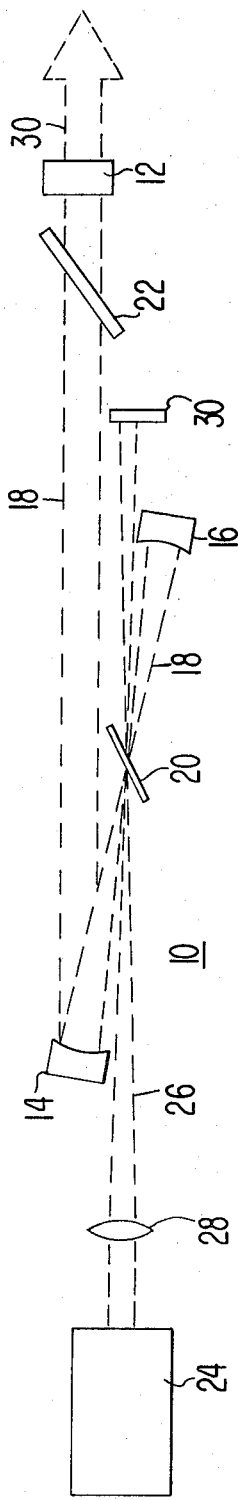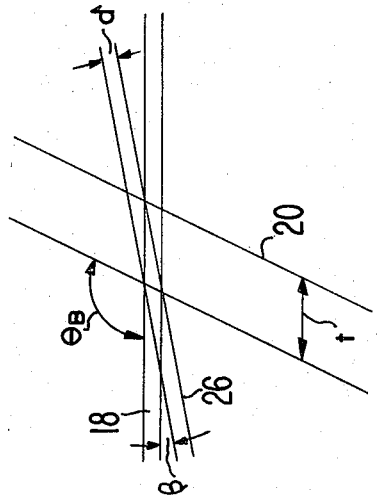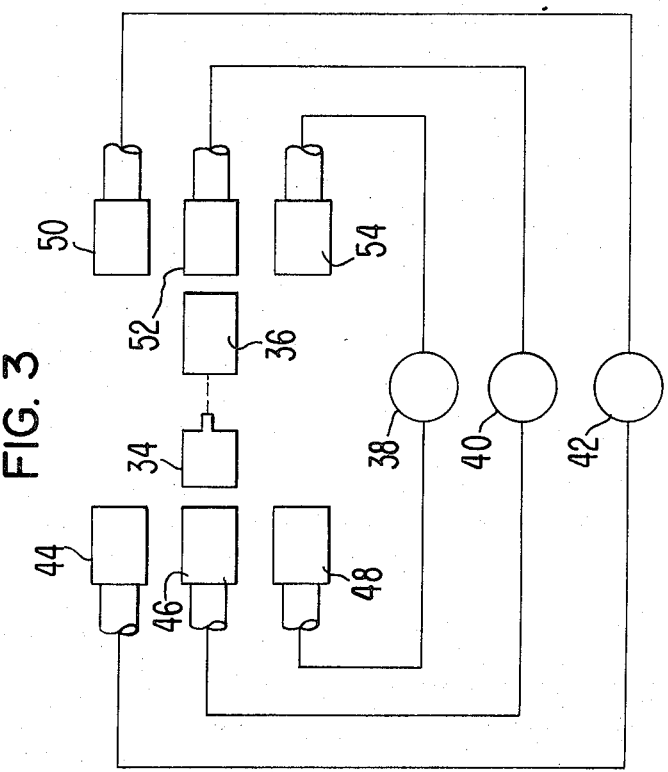

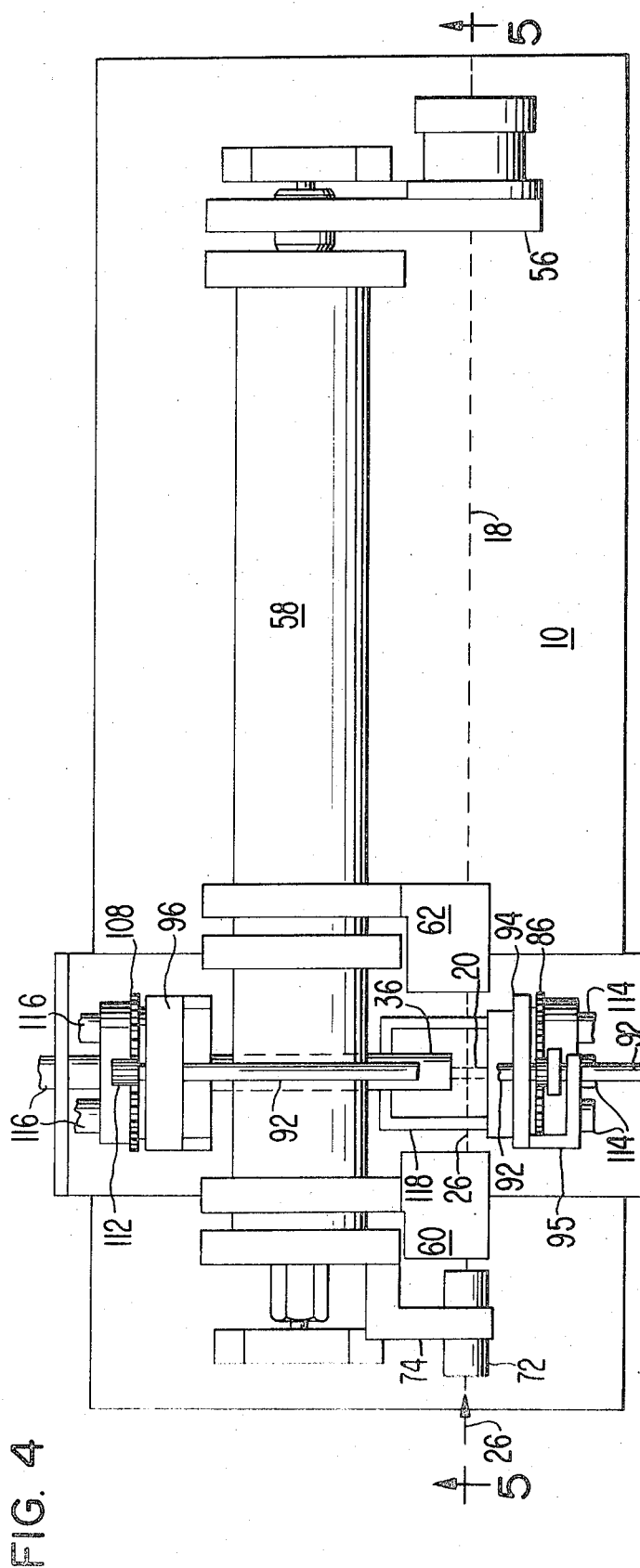
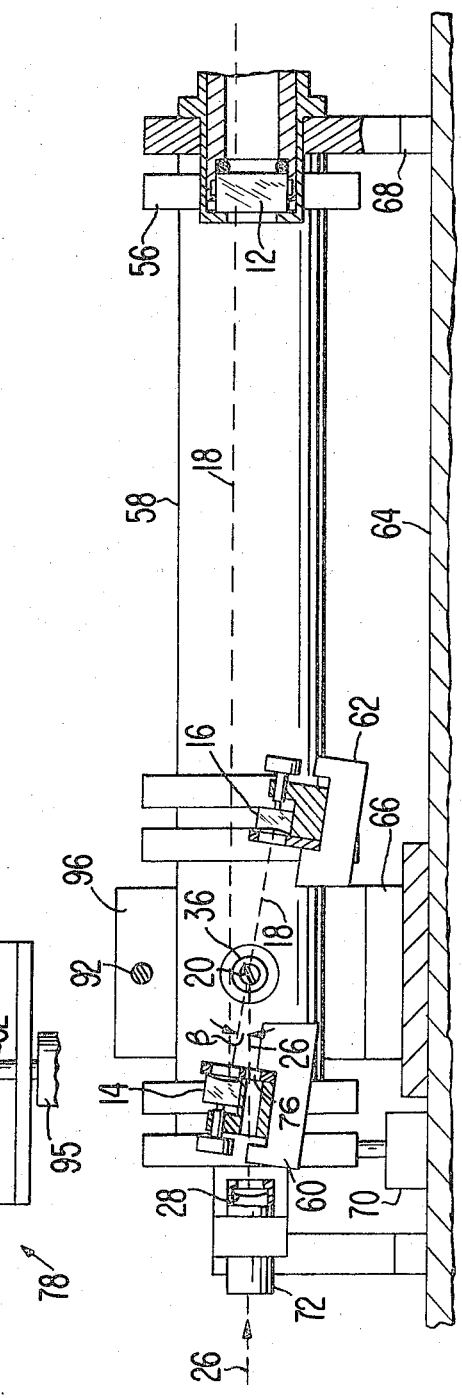
FIG. 4
FIG. 5

MULTIPLE DYE STREAM LASER

BACKGROUND OF THE INVENTION

The present invention relates to dye lasers and, in particular, to a dye laser having a broad range of output wavelengths.

Dye lasers have attracted much attention recently because of their property of being able to provide output wavelengths continuously over comparatively large segments of the visible spectrum. In contrast, other lasers are only capable of providing strong output wavelengths at a limited number of discrete wavelengths.

Individual dyes have different ranges of wavelengths, both from the standpoint of the part of the spectrum occupied as well as the band width. Presently, if a user of a dye laser desires an output wavelength beyond that of the dye used by the laser, he must replace the existing dye with new dye which does provide the wavelength which he desires.

This is obviously quite inconvenient and time consuming, and is subject to possible major contamination when the new dye is put into the system to replace the old dye.

SUMMARY OF THE INVENTION

Therefore, an object of the present invention is to provide an improved dye laser.

Another object of the present invention is to provide a dye laser having a greater range of output wavelengths than previous dye lasers.

Another object of the invention is to provide a dye laser utilizing a plurality of different dyes to enable greater variety of the output wavelengths.

In accordance with the present invention, a dye laser is provided with means for selectively introducing any one of a plurality of different dyes across the optical path of the dye resonator cavity where each of the dyes has a different range of lasing wavelengths, to provide a broad range of output wavelengths.

In the preferred embodiment, each of the dyes is introduced within the optical cavity as an unconfined, thin, flat fluid stream, preferably at Brewster's angle to the optical path. Each of the different dyes is provided with its own circulation system. In this manner, the dyes are not intermixed and contamination is prevented.

In a preferred embodiment, a single nozzle is provided which defines the geometry of the dye stream. Since the same nozzle is used, the dye stream will have the same geometric characteristics regardless of which particular dye is used. A turret assembly is used for rotating pre-aligned inlet and outlet ports connected to conduits connected to dye pump modules in each circulation system. The input and output ports are ganged so that the dye which leaves the optical cavity is circulated within its own circulation system.

Additionally, various means are provided to prevent contamination resulting when switching from one dye to another.

While a rotary turret system is hereinafter described, for aligning the input and output ports, it should be understood that the present invention is not limited to that particular configuration. For example, a linearly sliding system could function equally well. Also, while a single nozzle is utilized for each of the different dyes because it has proven to be quite satisfactory, in other applications, a separate nozzle for each dye could be utilized.

There is no limitation to the number of different dyes that can be used. As an example, however, in one dye laser utilizing the present invention, the tunable output wavelengths range from 5,300 A to 7,000 A. This dye laser utilized four dyes. These four dyes with the wavelength range of each is as follows:

5300 A to 5850 A Sodium Fluorescein
5700 A to 6400 A Rhodamine 6G
5900 A to 6550 A Rhodamine B
6500 A to 7000 A Cresyl Violet.

BRIEF DESCRIPTION OF THE DRAWINGS

FIG. 1 is an optical schematic diagram of one aspect of an improved dye laser in accordance with the resent invention.

FIG. 2 is an enlarged illustration of a part of the dye laser illustrated in FIG. 1.

FIG. 3 is a block diagram of another aspect of a dye laser in accordance with the present invention.

FIG. 4 is a detailed plan view of a dye laser in accordance with the present invention.

FIG. 5 is an elevational view of the dye laser of FIG. 1 in the direction indicated.

DESCRIPTION OF THE PREFERRED EMBODIMENTS

Figure 6:
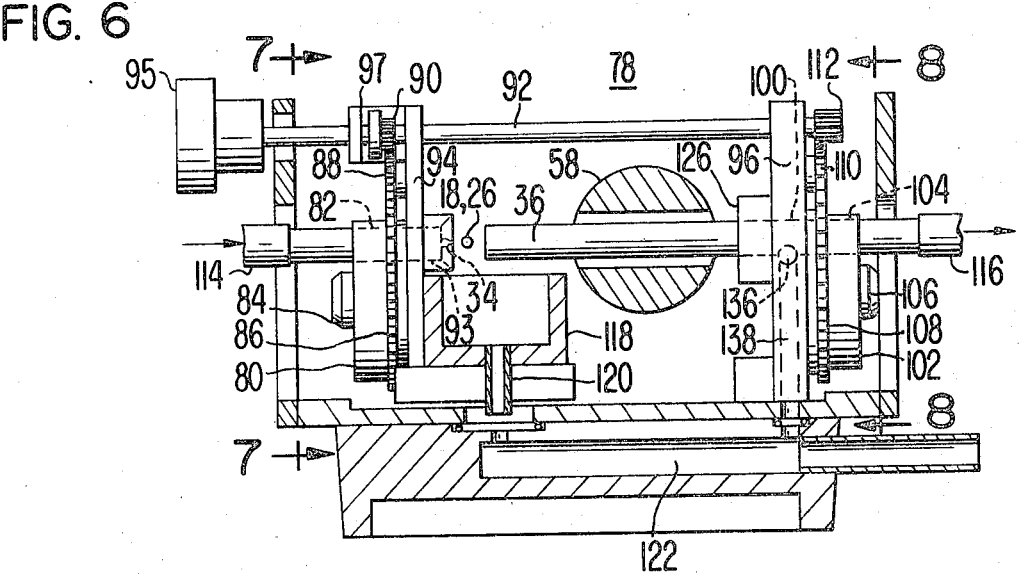
FIG. 6 is an elevational view of one part of the dye laser of FIG. 4.
Figure 7:
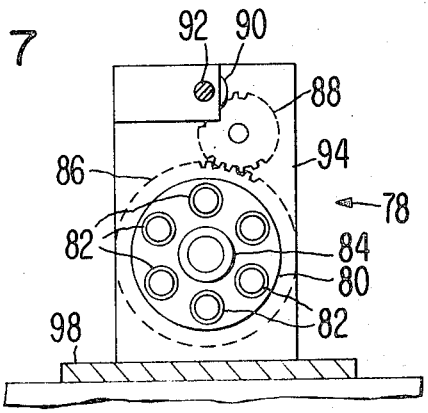
FIG. 7 is a cross-sectional view of the assembly of FIG. 6 in the direction indicated.
Figure 8:
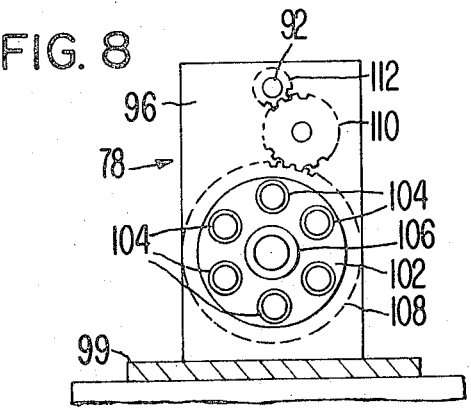
FIG. 8 is a cross-sectional view of the assembly of FIG. 6 in the direction indicated.

FIG. 1 is an optical schematic of a dye laser 10 in accordance with the present invention. Dye laser 10 includes an optical resonator cavity comprising an output coupler or reflector 12, a first substantially totally reflecting broad band reflector 14 and a second substantially totally reflecting broad band reflector 16. An optical path 18 is defined by the three reflectors 12, 14 and 16.

A dye stream or jet 20 intersects the optical path 18 at the focal point of the two reflectors 14 and 16. The arrangement of reflectors 12, 14 and 16 in this manner is a well-known technique to astigmatically compensate for the introduction of the fluid stream 20 at Brewster's angle with respect to the optical path 18. By being at Brewster's angle, there is maximum transmission of light through the fluid stream for light which is vertically polarized.

A tuning mechanism 22 also intersects the optical path 18. The purpose of tuning mechanism 22 is to adjust the output wavelength of the dye laser 10. Any number of suitable tuning mechanisms are available. One example is described in copending patent application entitled "Improved Tuning Apparatus for a Dye Laser," Ser. No. 365,317, Filed on May 30, 1973 by Hobard and Yarborough and assigned to the assignee of the present invention.

A laser 24 such as an argon ion laser is used to optically pump the dye stream 20. The output pumping beam 26 is focused by means of a focus lens 28 so that the pump beam is very narrow as it passes through the dye stream 20. A pump stop 30 absorbs any of the pump beam 26 which is not absorbed by the dye stream 20.

The pump beam 26 enters the optical cavity of the dye laser 10 obliquely with respect to the optical path 18. That is, the pump beam 26 is non-collinear with the optical path 18. This enables the dye stream 20 to be directly pumped by the pump beam 26 from laser 24. Since the pump beam is non-collinear with respect to the optical path 18, no part of the pump beam is introduced into the output beam 30 of dye laser 10 as a result of the pump beam 26.

An enlarged view of the dye stream 20 as it intersects the optical path 18 of the resonator cavity is illustrated in FIG. 3. For purposes of the illustration, it is assumed that both the pump beam 26 and the optical path 18 are constant in diameter as they pass through the dye. Although not exactly accurate, this is a reasonable approximation.

Note that the dye stream 20 is at Brewster's angle, $\theta_b$, to the optical path 18. The dye laser oscillations follow the optical path 18. Thus, it can be seen that as the dye laser oscillations pass through the dye 20, the width or "waist" of the dye laser oscillations is very small.

Assuming that the pump beam and dye laser oscillation waist are the same, it has been found that the angle $\beta$ between the optical path 18 and the pump beam 26 should be no greater than the angle defined as follows:

$$\beta_{max} = d/t \text{ radians} = d/t \times 57.3°$$

If the angle is greater than this, the efficiency of the dye laser 10 drops off rapidly and eventually the output from the dye laser 10 terminates.

A scheme for providing multiple dye streams within the resonator cavity of dye laser 10 is depicted in FIG. 3. By multiple dye streams, it is meant that a number of different dyes, each having different lasing wavelengths, can be provided within the dye laser resonator cavity. Each dye stream exits from a nozzle 34 and is recieved and collected by a collector member 36. For purposes of clarity, in the scheme depicted in FIG. 3, only three independent types of dyes can be introduced into the nozzle 34 to form the dye stream. Of course, it should be understood that any number of different dyes can be introduced.

Each different dye is provided with its own circulation system. Individual pump modules 38, 40 and 42 are provided for each different dye circulation system. Each of these modules contains a pump, a pump drive motor, a dye reservoir, and a filter with a typical pore size of two microns. The filter removes any impurities which could degrade or terminate the dye laser oscillations. A heat exchanger can also be provided as a part of each circulation system to remove heat absorbed in the dye laser. This increases the viscosity of the dye to lessen the formation of bubbles in the stream. Between 15–20° C. has proven to be a satisfactory dye temperature.

Connected to the output side of pump modules 38, 40 and 42 are conduits for transporting the dye which are terminated by nozzle input ports 44, 46 and 48, respectively. At any given time, one of these ports is aligned with the nozzle 34. Similarly, exit ports 50, 52 and 54 terminate another series of conduits which are linked to the input side of pump filtration modules 38, 40 and 42, respectively.

Means are provided so that any one of the pairs 44–50, 46–52 or 48–54 of ports can be aligned with the nozzle 34 and the collector member 36. When a pair of ports is in alignment, the pump module pumps the fluid through the exit port, through the nozzle 34 where it becomes an unsupported and unconfined fluid jet as it crosses the optical cavity of the laser. The dye is then returned to its pump module. Since each dye has a different range of wavelengths, the output range of wavelengths from dye laser 10 in accordance with the present invention is much greater than that for previous dye lasers utilizing only a single dye.

A more detailed illustration of a dye laser 10 incorporating the resent invention is shown in FIGS. 4–9. Output reflector 12 is mounted within an output reflector support assembly 56 which, in turn, is mounted to resonator support rod 58. Reflector 14 is encased within a reflector support 60 which is supported by resonator support 58. Similarly, reflector 16 is mounted in a reflector housing 62 which likewise is supported by the resonator support 58. Resonator support 58 is attached to a baseplate 64 by a support pedestal 66 and support legs 68 and 70.

The focus lens 28 is secured within housing 72 which is, in turn, supported by member 74 attached to the resonator support 58. An aperture 76 is provided in reflector housing 60 to enable the pump beam 26 to pass under reflector 14 and intersect the dye stream 20 in the manner described previously. Suitable adjusting means are provided for each of the reflectors 12, 14 and 16 and the focusing lens 28.

A turret assembly 78 is provided to enable different dyes to pass through the optical cavity of the dye laser 10. Reference is made particularly to FIGS. 4, 6, 7 and 8. Turret assembly 78 includes a rotary input plate 80 having a plurality of ports 82 extending around the circumference of the plate 80. Plate 80 rotates around a central hub 84 so that individual input ports 82 can be aligned with the nozzle 34.

Also provided around the circumference of the rotary plate 80 is a series of gear teeth 86. A pair of step down gears 88 and 90 are coupled to a rotatable shaft 92. By turning an adjusting knob 95, the rotary plate 80 can be rotated to align any one of the ports 82 with the nozzle 34.

Nozzle 34 is secured to a support plate 94 which includes a base portion 98 and an appendage 97 for supporting shaft 92. Gear 90 is mounted upon shaft 92, and gear 88 is secured to the support plate 94. Shaft 92 can be rotated by knob 95.

Figure 9:
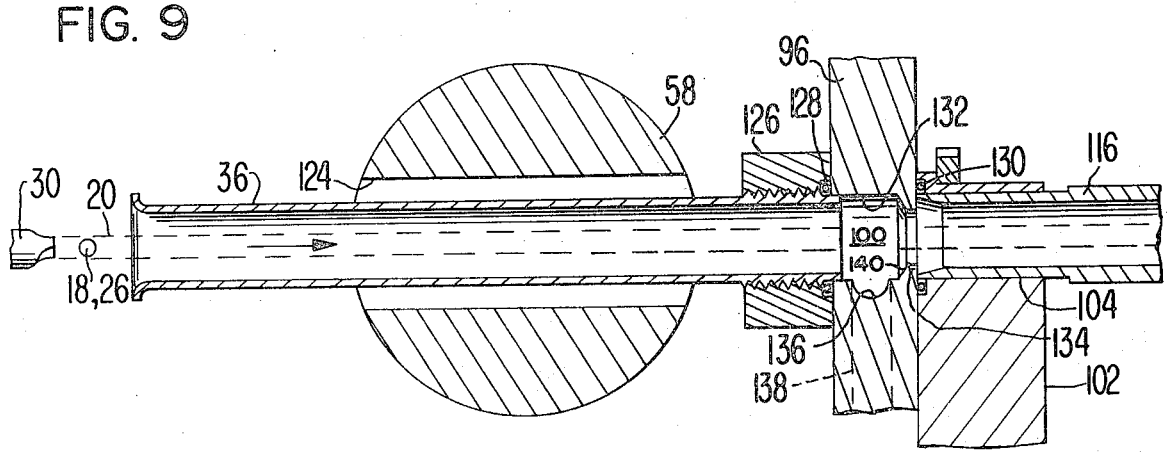
FIG. 9 is an enlarged view of a portion of the assembly of FIG. 6.

Collector member 36 is supported by support plate 96 extending upward from the turret baseplate 99. Referring additionally to FIG. 9, an aperture 100 extends through the support plate 96. An output rotary plate 102 similar to the input rotary plate 80 is provided with a plurality of spaced-apart ports 104 extending through the outer circumference thereof. Rotary plate 102 is mounted at its hub 106 so that each of the ports 104 can be aligned with the aperture 100 extending through the support plate 96.

A set of gear teeth 108 is also provided around the circumference of the output rotary plate 102. In engagement with the gear teeth 108 are first and second gears 110 and 112. Gear 112 has the same diameter as gear 90 and gear 110 the same as 88. The gear wheel defined by the gear teeth 108 has the same diameter as the gear defined by the gear teeth 86. Consequently, since gear 112 is connected to the same shaft 92 as gear 90, the two rotary plates 80 and 102 are ganged.

Input conduits 114 carry different dyes to each of the ports 82 formed in the input rotary plate 80. Similarly, output conduits 116 carry the dye fluids back from the individual ports 104 to the respective pump module for each.

In operation, when a particular dye is desired, the operator rotates the tuning knob 95 to align the desired input aperture 82 with the nozzle 94. If a different dye was previously in use, its pump must first be turned off. Because the output rotary plate 102 is ganged with the input rotary plate 80, the correct port 104 will automatically be aligned with the collecting member 36. The pump for the desired dye is then turned on and the dye flows through the input conduit 114, through the rotary plate 80 and out of the nozzle 34 as a flat, unsupported, unconfined fluid stream. If desired, the switching for carrying out this function can be built into the turret assembly.

The dye stream passes through the collector member 36, through aperture 100, through the output rotary plate port 104 and finally it is returned through the output conduit 116 back to the dye pump module. Any dye which does not pass through collector member 36 falls into a reservoir 118 which is provided with a series of drain tubes 120 and 122 for removing this waste dye.

Referring particularly to FIGS. 6 and 9, the collector member 36 extends through a passageway 124 provided through the resonator support member 58. To maintain a waterproof seal between the collector 36 and the output rotary plate 96, a threaded nut 126 is used to tightly hold an O-ring 128 against plate 96. O-rings 130 are also provided to seal each of the exit ports 104, as well as the input ports 82 (not shown). Input ports 82 not in alignment with the nozzle 34 are blocked by plate 94. Similarly, exit ports 104 not in alignment with the collector 36 are blocked by plate 96.

Whenever a dye stream is terminated and as the stream collapses, some of the dye will drop to the bottom part of the collecting member 36. Thus, when another dye stream is introduced, it is desirable to prevent intermixing of the new dye with the old dye remaining in the collecting member.

To accomplish this, aperture 100 extending through the plate 96 includes a first region 132 having a greater diameter than a second region 134, which is nearest the exit port 104. Running along the bottom of section 132 is a trough 136 connected to an output pipe 138. Once a new dye stream is fully established, it extends all the way from the nozzle 34 through the aperture 100 and into the output conduit 116. Thus, substantially none of the dye accumulates within the collector member 36. However, when a dye stream is first started up, it strikes along the bottom of the collector member 36. This has the effect of flushing out any dye remaining from a previous operation. The old dye is swept along the collector tube 36 and into the trough 136 and out of the outlet 138. The stepped face 140 between the larger diameter portion 132 and the smaller diameter portion 134 of the aperture 100 prevents the old dye from entering into the outlet tube 116, thereby preventing contamination.

When the pump is turned off to terminate a dye stream 20, most of the dye which remains in the nozzle 34 is drawn back into the pump and reservoir. Whatever dye does remain is the first which leaves the nozzle 34 when a new dye is introduced and, as explained previously, falls along the bottom of the collector member 36 and eventually is swept out of the exit conduit 138. Thus, there is little possibility of any substantial contamination of the new dye with any remaining old dye.

A typical volume of dye for any given circulation system is around 1500 cm$^3$. The volume of the nozzle which retains the dye in one specific example is 0.01 cm$^3$. It can be seen that even in the worst case, that is with the nozzle completely filled with the old dye and if all of the old dye gets into the new dye, it would take many repeated operations for any substantial contamination to occur.

The nozzle 34 can be made from a small tube whose end is stamped down to define a narrow slit. This slit defines the geometry of the dye stream 20. In one embodiment, the aperture of the nozzle 34 is 0.01 inch thick by 0.06 inch long.

A suitable motor to circulate the dye is one made by Micro-Pump, Model No. 15-60-303. This pump has a pumping force of about 40 lbs. per square inch and provides a dye velocity of approximately 6 meters per second.

While the foregoing describes the present invention in sufficient detail to enable one skilled in the art to duplicate it, the following table of parameters of one actual embodiment of a dye laser incorporating the present invention is set forth:

| | |
|---|---|
| Reflector 12 | Flat reflector, 4% transmissive |
| Reflector 14 | 7.5 cm. radius; high reflectance |
| Reflector 16 | 5 cm. radius; high reflectance |
| Spacing between Reflector 12 and Reflector 14 | 30 cm. |
| Spacing between Reflector 14 and Reflector 16 | 8.75 cm. |
| Focal point of Reflectors 14 and 16 (position of fluid stream 20) | 3.75 cm. from reflector 14<br>5.0 cm. from reflector 16 |
| Focus lens 28 | 6 cm. |
| Spacing between lens 28 and dye stream 20 | 6 cm. |
| Pump laser 24 | Argon ion laser, Model 52, manufactured by Coherent Radiation |
| Examples of four different dyes and their wavelength ranges | 5300 A – 5850 A Sodium Fluorescein<br>5700 A – 6400 A Rhodamine 6G<br>5900 A – 6550 A Rhodamine B<br>6500 A – 7000 A Cresyl Violet |
| Dye Carrier | 2 grs. dye/ 1½ liters ethylene glycol |

The tuning mechanism 22 shown in FIG. 1 has not been shown in FIGS. 4–9 for purposes of clarity. However, it is to be understood that the tuning device described in the copending patent application referred to above could be inserted within the resonator cavity to effectuate tuning of dye laser 10.

I claim:
1. A dye laser comprising:
   a. an optical resonator cavity;
   b. means for providing a flat, unsupported fluid stream of dye within said optical resonator cavity to intersect the optical cavity thereof, said dye providing means comprising:
      i. a nozzle from which said fluid streams exit into said optical resonator cavity;
      ii. a plurality of sources of different dyes having different ranges of lasing wavelengths;

iii. first means for selectively providing any single one of said plurality of dyes to said nozzle to provide said unconfined fluid stream; and iv. means for collecting said unsupported fluid stream after it passes through said optical path; and c. means for optically pumping said dye stream.

2. A dye laser as in claim 1 including independent circulation systems for each of said separate dyes, nd including second means for selectively coupling individual ones of said independent circulation systems with said collecting means, and means for synchronously operating said first and second means to maintain the integrity of each separate dye circulation system.

3. A dye laser as in claim 2 wherein said first and second means comprise a ganged rotary turret mechanism.

4. A dye laser as in claim 2 wherein said first means comprises:
  a. an input rotary plate;
  b. a plurality of spaced-apart ports through said plate located around the circumference of said plate;
  c. means of selectively aligning each of said ports with said nozzle;
  d. means for blocking each port which is in non-alignment with said nozzle; and
  e. means for introducing different dyes through said ports.

5. A dye laser as in claim 4 wherein said second means comprises:
  a. an output rotary plate;
  b. a plurality of spaced-apart ports through said plate located around the circumference of said plate;
  c. means of selectively aligning each of said ports with said nozzle; and
  d. means associated with each of said ports for returning each different dye to its respective circulation system, wherein said synchronously operating means comprises means for ganging said input and output rotary plates.

6. A laser as in claim 2 including means for preventing contamination of different dyes when said dye laser is switched from one dye to another.

7. In a dye laser having an optical resonator and pumping means and wherein the invention comprises means for selectively introducing any one of a plurality of different dyes across the said optical path, each of said dyes having a different range of lasing wavelengths.

8. A dye laser as in claim 7 wherein said dye introducing means includes means for selectively providing each of said plurality of dyes as an unconfined thin flat fluid stream.

* * * * *

Disclaimer 3,846,715.—*J. Michael Yarborough*, Santa Clara, Calif. MULTIPLE DYE STREAM LASER. Patent dated Nov. 5, 1974. Disclaimer filed Mar. 26, 1975, by the assignee, *Coherent Radiation*.

Hereby enters this disclaimer to claim 7 of said patent.

[*Official Gazette June 24, 1975.*]